June 2, 1970  S. E. MILLER  3,515,081
APPARATUS FOR FEEDING AND CUTTING STRIP MATERIAL
Filed Nov. 21, 1968  5 Sheets-Sheet 1

INVENTOR
Samuel E. Miller
By Leonard S. Knox
Att'y

June 2, 1970  S. E. MILLER  3,515,081
APPARATUS FOR FEEDING AND CUTTING STRIP MATERIAL
Filed Nov. 21, 1968  5 Sheets-Sheet 3

United States Patent Office 3,515,081
Patented June 2, 1970

3,515,081
APPARATUS FOR FEEDING AND CUTTING STRIP MATERIAL
Samuel E. Miller, Wilmette, Ill., assignor to Quick Service Textiles, Inc., Chicago, Ill., a corporation of Illinois
Filed Nov. 21, 1968, Ser. No. 777,592
Int. Cl. D05b 35/10, 37/06
U.S. Cl. 112—130
6 Claims

ABSTRACT OF THE DISCLOSURE

Apparatus for sewing predetermined lengths of two or more different materials in strip form to a base strip in sequence along the latter. The base strip is fed continuously to the sewing station and the successive lengths of the first-mentioned materials are fed to the sewing station selectively in sequence. The first-mentioned materials are fed from respective sources of supply and are cut off to predetermined length cyclically by automatic or semiautomatic means.

---

The invention has reference to apparatus as broadly referred to in the abstract adapted for feeding first strips of different kinds, e.g. textile materials, selectively and in sequence for incorporation with a base strip, this latter being, for example, waistbanding comprising a shell fabric waistband together with a curtain assembly.

This invention comprises improvements in the apparatus shown and described in my U.S. Pat. No. 3,381,639, granted May 7, 1968. In that patent I disclosed apparatus for feeding a base member, e.g., a sub-assembly of fabric elements constituting a waistband and the curtain assembly for a garment, and jointly feeding another strip, e.g., textile fabric, to be sewn to the waistband and the curtain assembly to serve as a stiffening element therefor. Since the stiffening element, at least in the illustrative case, functions to preclude roll-over of the top of the garment it is desirably incorporated in the waistband and the curtain assembly only at the front portion thereof, regarded in terms of the completed garment. Further reference is made to my U.S. Pat. No. 3,155,986, granted Nov. 10, 1964. Accordingly the apparatus disclosed in my said Pat. No. 3,381,639 is capable of feeding a specific length of the stiffening element to be sewn into the waistband and the curtain assembly cutting the element to a predetermined length and so on, cyclically.

It is desired to incorporate a strip of some less expensive stiffening material, e.g. canvas, with the waistband and the curtain assembly desirably with at least the top edge thereof in alignment with the top edge of the stiffening element of my said Pat. No. 3,155,986. In accordance with the present invention the desired length of each kind of stiffening material is fed selectively and automatically to the presser foot and feed dog of the sewing machine along with the waistband and the curtain assembly, the latter usually comprising layers which have been pre-sewn. As an example of the incorporation of two different strips into the waistband and the curtain assembly, the stiffening element of my Pat. No. 3,155,986 may be fed alternately with a strip of canvas (sometimes termed "buckram"). Thus, the garment fabricator will be provided with waistbanding which, when cut off to proper length, may be assembled in a garment, e.g. a pair of trousers, with the first mentioned stiffening element at the front half and the second mentioned at the rear half. Inasmuch as the stiffening element of my said patent serves its function only at the front half of the garment, and might cause discomfort in the rear half, it is preferably used only in the front half. Further, for reasons of cost, the cheaper canvas can be used in the rear half where it will perform its conventional stiffening function. Additionally, since canvas will handle better than the special stiffening element of my said patent, fabrication of the outlet, say, a pair of trousers, is simpler and the manufacturing cost of the garment lowered. The added strips are preferably overlapped some minor distance to lend continuity to the handle of the completed waistband, i.e. to avoid a "break" line in the waistband of the garment. However, the apparatus disclosed herein is capable of feeding the successive strips in end-to-end abutting relation or even with a gap therebetween. Moreover, although two different kinds of strips are referred to illustratively, it will become apparent that, within the principles of the invention, a greater plurality is possible.

Where, for conciseness herein, I refer to "stiffening element" and "stiffening material" I intend to refer to different kinds of strip which may or may not be intended to lend rigidity to the waistband. However, in general, when the strips function to rigidify they are arranged in the waistband and curtain assembly in such manner that the respective top edges thereof are aligned and positioned at the top edge of the waistbanding as sewn into the completed garment. Where, herein, I refer to "sub-assembly" I intend to refer to the several components of a waistband and curtain assembly exclusive of the rigidifying strips and, by the term "waistbanding," I mean the waistband and curtain assembly together with the rigidifying strips in a commercially complete form ready for the garment manufacturer.

At this juncture it is to be noted that the invention apparatus has utility in a case where lengths of different materials are to be overlapped and sewn at the overlap to yield a continuous strip, i.e. the waistband and the curtain assembly is omitted. Further, that the shell waistband and the curtain assembly are combined by sewing, with the selected strip then being fed, the feeding of these components being accomplished by the presser foot and feed dog of the sewing machine. If desired portions of the shell of the garment, e.g. the two halves of a pair of trousers may be fed jointly therewith. For particulars, reference is made to my said Pat. No. 3,381,639.

Where, herein, I refer to the "top edge" of the waistband or of the garment I intend to refer to that edge which is uppermost in the garment as worn.

In accordance with the invention the selected component to be combined with the waistband and the curtain assembly is fed through an individual guide toward and between the presser foot and feed dog of the sewing machine which then assumes the feeding function. This guide is so constructed and arranged as to establish and maintatin the edge of the component in a predetermined path, e.g. with the left hand edge thereof on a line which corresponds to the top edge of the waistband. To avoid jamming of the leading end of the strip, when introducing the same into the guide, a movable finger adapted to bear against the right hand edge of the strip is momentarily retracted and, when the leading end of the strip has exited from the guide, the finger is restored to establish the precise path for the strip.

Where, herein I employ the words "right" and "left" I refer to the same as viewed from the operator's position at the front of the sewing machine.

Means are also provided for feeding the plurality of strips singly and selectively to a position whereat the leading end is seized between the presser foot and feed dog, at which moment the feeding means is de-activated pending feeding of the succeeding strip.

In accordance with the invention novel means are provided for cutting off the strip then being sewn, irrespective of whether this latter is from one source of supply or another.

Desirably the initiation of feed and cutting off of the travelling strip at the desired point are under the control of the operator, but may be automatic. For example, initiation of feed and cut-off may be in response to pedal actuation and selection of the succeeding strip material may be automatic in response to a preceding cut-off step.

As the description proceeds it will become apparent that, although pneumatically-driven mechanisms are shown by way of example, air-operated means may be replaced by hydraulic means and electrical or electromechanical means may substitute for or supplement all or part of such pneumatic or hydraulic means. In general, any of such means may be referred to broadly as "power means."

One of the principal advantages of the invention is the elimination of the need to interrupt operation of the sewing machine at any time in the cycle. The arrangement of the apparatus is such that action of the cut-off mechanism is extremely rapid and the moving strip can, therefore, be severed practically instantaneously.

Another object is to provide apparatus for the purpose aforesaid which is capable of adaptation to virtually any industrial sewing machine with little or no alteration in the same.

Other objects and advantages of the invention will become apparent from the ensuing description which, taken with the accompanying drawings, discloses certain preferred forms in which the principles of the invention may be embodied in practice.

By way of example the invention apparatus will be described with reference to the incorporation, by sewing, with a typical form of waistband and curtain assembly, of a strip of one kind followed by a strip of another kind, in alternated sequence. Such waistband and curtain assemblies vary between garment manufacturers. However, since the present invention has to do with the addition thereto of strips having specialized functions, as described above, only a very simple waistband and curtain assembly will be used by way of illustration. Should it be desirable to feed more than two strips in sequence it will be evident that the apparatus may be readily modified to accommodate such plurality which, in essence, involves only multiplication of components. It is also possible to feed only a single strip to the sewing station simply by omitting to thread the unwanted strip into the chute therefor and/or disabling the associated components. Alternatively the principles of the invention are capable of being embodied in apparatus initially intended to feed a single strip. The waistband and curtain assembly and the garment shell fabric, if any, are desirably fed to the sewing station on a lower level and the strip or strips on an upper level. The feeding action applied to the strip or strips need be only sufficient to introduce the leading end to a position between the presser foot and feed dog of the sewing machine, from which position feeding is continued by the feed dog in cooperation with the presser foot, as is conventional.

Adverting to the drawings there is shown a sewing machine 10 mounted on a base 11 and having a needle 13 and a presser foot 14. Below this latter, but not shown, is the conventional serrated feed dog which cooperates with the presser foot in advancing the components being sewn.

Mounted on the base 11, or a table on which the base is supported, is a guide chute sub-assembly 20 comprising a pair of tubes 22a and 22b of rectangular cross section (FIGS. 3 and 4) through which individual ones of the two strips 24a and 24b are fed on their way to sewing position. If desired, portions of the wider wall of the tubes may be left open to serve as windows for access to, and initial feeding of the strips thereinto, such as when a fresh supply is begun. At the lower end the sub-assembly 20 is supported on a bracket 30 secured to any convenient fixed point.

Figure 1:
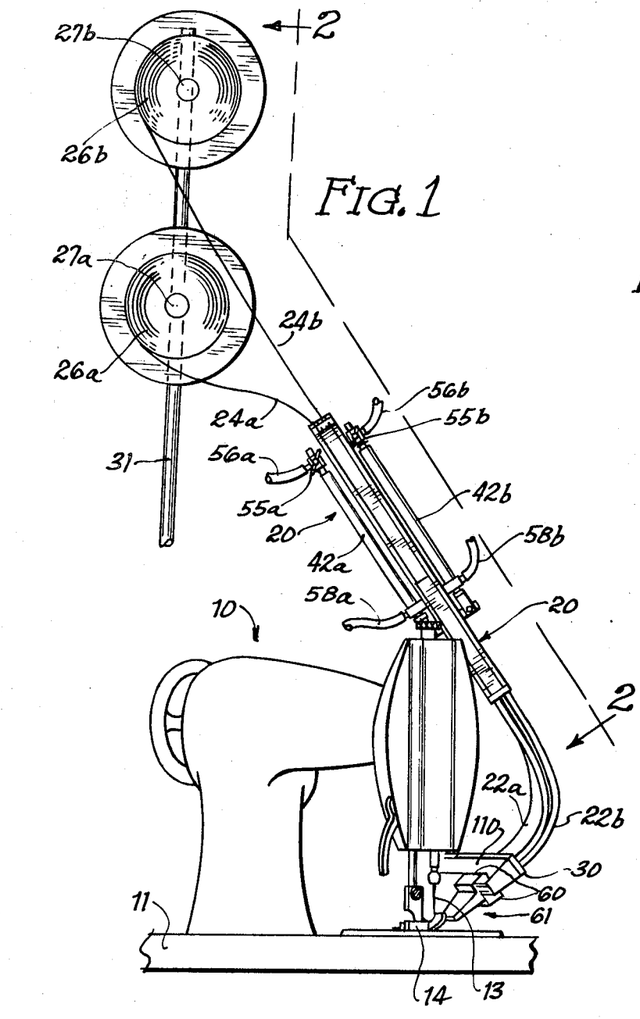
FIG. 1 is a side view showing the chutes for guiding two different kinds of strips to the sewing station.
Figure 2:
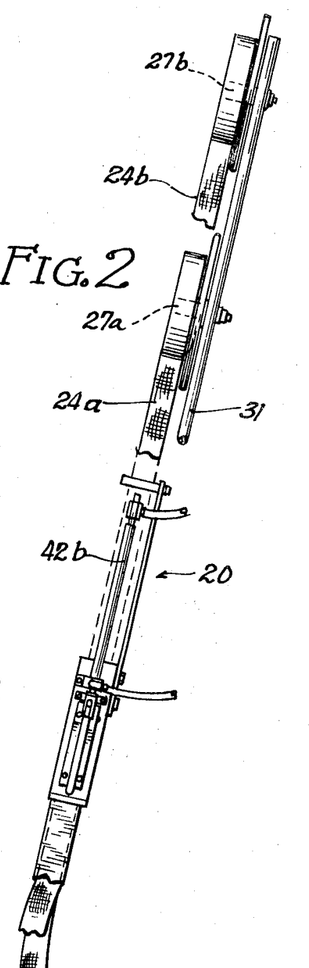
FIG. 2 is a front view of the same.

The supply of the two strip materials is preferably in the form of rolls 26a and 26b carried on spindles 27a and 27b, these being supported on a rod 31 carried on the work table in the usual manner. In order not to obstruct the operator's vision or access the tubes 22a and 22b are skewed, as best seen in FIGS. 1 to 3, to position the greater part thereof beyond the operator's range of vision during operation of the machine.

Figures 3, 4, 5, 6, 7, 8, 9:
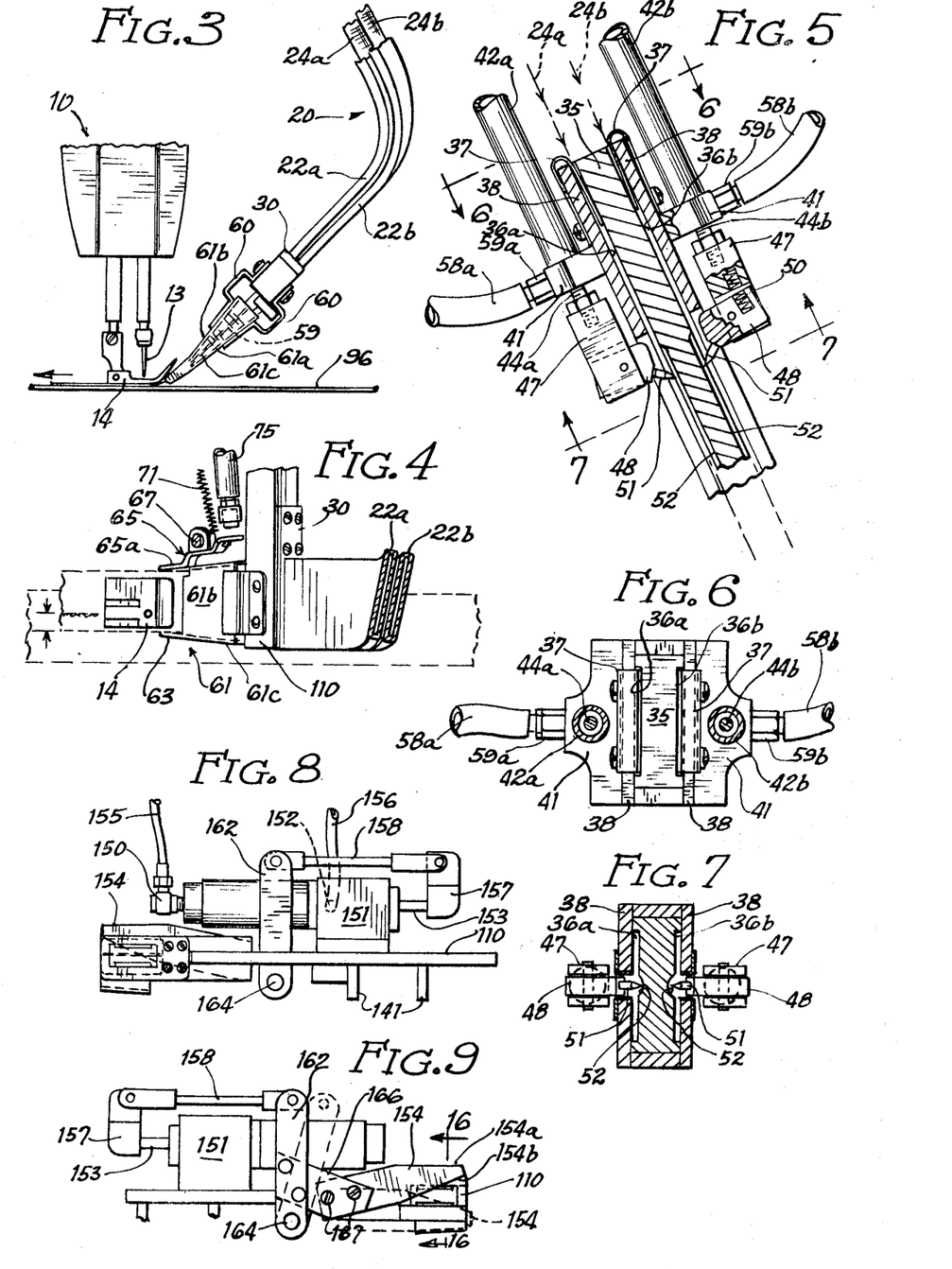
FIG. 3 is a view of a portion of the apparatus to emphasize details adjacent the sewing station.
FIG. 4 is a plan view of the means for guiding the strip then being fed to the sewing station.
FIG. 5 is a combined cross section and elevation of the strip-feeding dogs and the parts directly adjacent thereto.
FIG. 6 is a cross section taken on the line 6—6 of FIG. 5.
FIG. 7 is a cross section taken on the line 7—7 of FIG. 5.
FIG. 8 is a detail of the cut-off means and the actuating means therefor, as viewed from the front.
FIG. 9 is a similar detail, as viewed from the rear.

Turning now to FIGS. 5, 6 and 7 the sub-assembly 20 includes a guiding and feed unit comprising a center block 35 recessed on both sides, as at 36a, 36b through which respective strips 24a, 24b travel on their way to sewing position. To avoid backlash upon restoration of the feed dogs to be described, the entrance end of each slot is provided with a hairpin spring 37 bearing on the respective strips. The side plates 38, 38 overlie the block 35 on opposite faces to define the slots 36a, 36b.

Carried on individual brackets 41, 41 are the air cylinders 42a and 42b, each having a piston rod and piston indicated jointly by the numerals 44a and 44b. At its free end each piston rod has a U-shaped piece 47, between the cheeks of which is pivoted a support 48 in which a feed dog 51 is secured. Each dog has a pointed working end extending into a recess 52 opening from the respective recesses 36a, 36b, whereby the dog may be free to penetrate the strip to feed the same. Bias is applied to each dog by means of a compression spring 50, one thereof being shown in FIG. 5, this spring applying a force such as to cause the point of the dog to penetrate the strip upon feeding movement, but to allow the point to be released from the strip, without drag, upon return to idle position. It will be seen that the axis of the dogs is inclined in the direction of travel for positive engagement and free release. As mentioned above, the hairpin springs 37 act to preclude any tendency of the strips to move reversely.

The pistons 44a, 44b are arranged to be air-operated in both directions although it is within contemplation that the active stroke be the result of air pressure and retraction be under spring bias.

In order that actuation of each piston be delayed slightly in order to have its actuation in proper phase with operation of the other air-operated components, delay valves 55a, 55b are interposed between the air lines 56a and 56b and the upper inlet of the respective cylinders 42a, 42b. In the example, the pistons 44a, 44b are restored to idle position by air admitted through lines 58a, 58b.

It will be noted that, in the interest of clarity, the strips are not illustrated in FIGS. 6 and 7, but are indicated by broken lines in FIG. 5.

From the preceding it will have become evident that, upon sequential activation of the pistons 44a, 44b, one or the other of the strips 24a or 24b will be advanced by the related dog 51. As will appear, the amount of advance will be such as to present the leading end of the selected strip between the presser foot and feed dog of the sewing machine. The means for selecting the appropriate cylinder and admitting air thereto will be described subsequently.

The waistband and curtain assembly, are guided laterally with respect to the line of stitching by any conventional guiding means attached to the base of the sewing machine. To locate the strip being fed in precise relation to the line along which sewing occurs, i.e. the needle, a guide throat assembly 61 (FIGS. 4 and 12) is provided. This assembly comprises a bottom wall 61a, a top wall 61b, a partition 59 therebetween, and side walls 61c, 61d having a mutually-inclined relation and defining a pair of entrance ends and a pair of exit ends through which respective ones of the strips are guided on their paths to the sewing station. The guide throat assembly is carried on a pair of brackets 60, 60 which are, in turn, secured to the block 110. As alluded to hereinabove, an important desideratum is that the left-hand edge of the strip, when introduced to the presser foot and feed dog, have a precise alignment with the other components to which it is sewn, and that a succeeding strip be aligned with its predecessor. Such result is attained in part by providing a lip 63, preferably formed as a forward extension of the wall 61c. However, if the right hand wall 61d were to be fixed and the strip fed between both side walls jamming could occur.

To avoid this contingency the walls 61c, 61d are so arranged as to define an exit throat allowing free passage of the strip, and means are provided to constrain the strip to travel with its left hand edge against the lip 63. This objective is achieved by the provision of a lever 65 having a finger 65a, and the lever is pivoted at 67 on a bracket 66. This latter may be integral with the guide 61 or otherwise. A spring 71 connected between the lever 65 and a fixed hook 72 normally biases the finger 65a against the right hand edge of the strip then being fed toward the sewing station. However, in order to admit the leading end of the strip to the exit end of the guide 61 the lever 65 is arranged to be momentarily pivoted to retract its finger. To this end a pneumatic cylinder is mounted on the bracket 66 by means of a strap 70, there being two independent inlet ports 76 and 77 including check valves for a purpose to appear. Retraction of the piston 79 is by a spring (not shown). The supply to the ports 76 and 77 is indicated at 81 and 82. The piston 79 is provided with a head 84 adapted, upon the outward stroke thereof to swing the lever clockwise (FIG. 12) to retract the finger 65a from contact with the strip. By this action the exit end of the guide 61 is, in effect, widened, to permit free passage of the strip and, upon retraction of the piston 79, the spring 71 will restore the finger 65a to bear on the right hand edge of the strip, thereby to urge the left hand edge against the fixed lip 63.

Figures 10, 11, 12, 14:
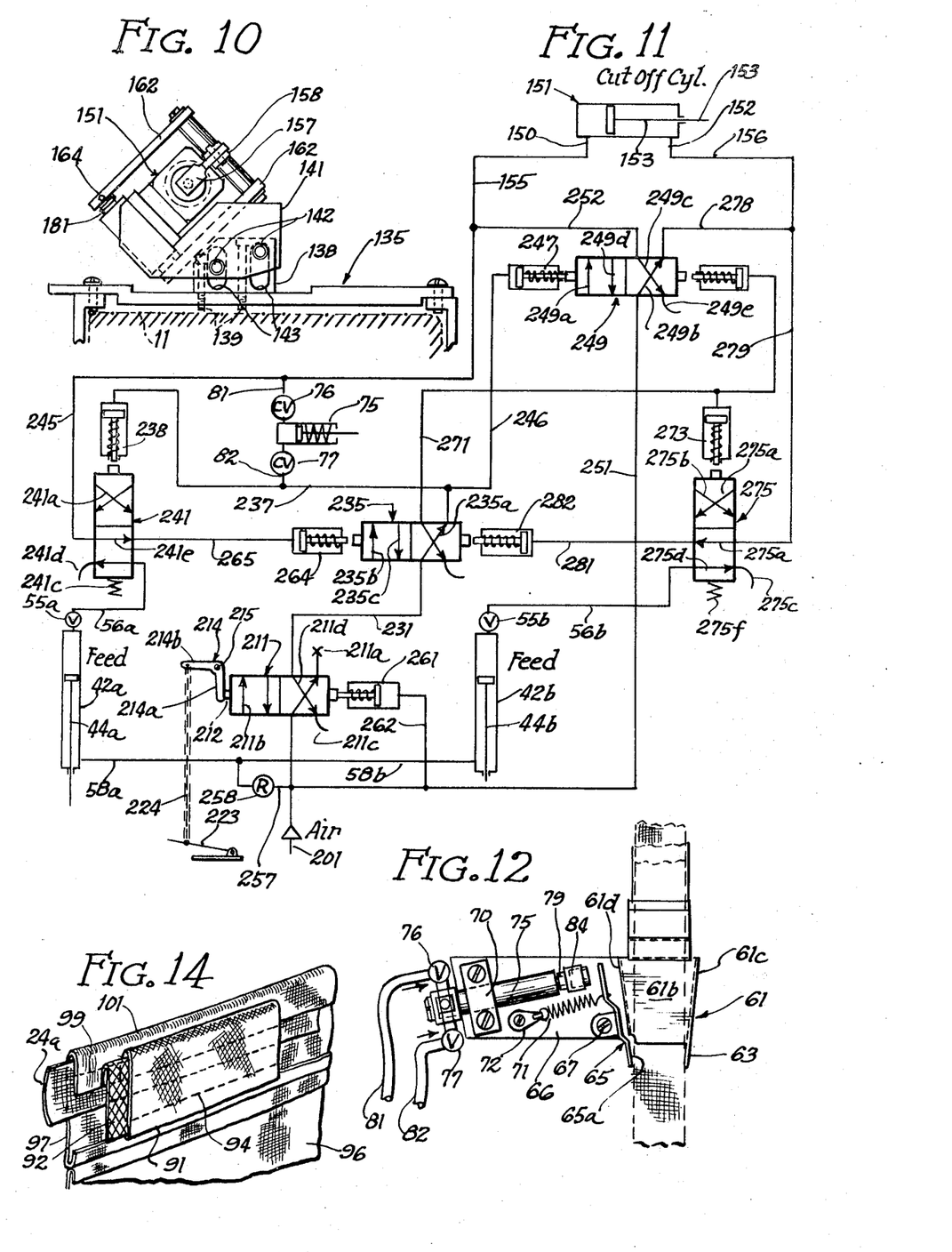
FIG. 10 is a side elevation, as viewed from the left, to show details of the means for actuating the cut-off means.
FIG. 11 is a more or less schematic layout to show the interrelation between the several components of the apparatus and the pneumatic circuits.
FIG. 12 is a plan view of the guide for the strip as it is fed to sewing position, and the mechanism for insuring alignment of the edge of such strip with respect to the waistband.
FIG. 14 is a perspective view of a typical assembly of a waistband and the curtain assembly together with a portion of one of the strips.

By employing a yielding guide for the right hand edge of the moving strip, i.e. the finger 65a, normal variations in the width of a strip and between different strips are readily accommodated. It will be understood that, in general, the two different strips 24a, 24b of the example, will be of the same width. However, they may, within commercial limits, be of different widths. In such case the guide 61 will be so dimensioned as to accept the greater width and the throw of the finger 65a relied upon to accommodate the difference, i.e. maintain the left hand edges of the different strips in alignment.

At this juncture it is believed desirable to describe a typical waistband and curtain assembly with which the strips 24a and 24b may be incorporated. Before doing so it is to be noted that, in this example, the parts of the curtain have been sewn along one side and the shell waistband and the selected strip are sewn thereto in one operation. However, the invention is capable of being used in a situation wherein all the components, i.e. the shell waistband and the curtain assembly are fed to the sewing machine along with a selected strip, 24a or 24b, and such strip and components are combined in a single sewing operation.

Figure 13:
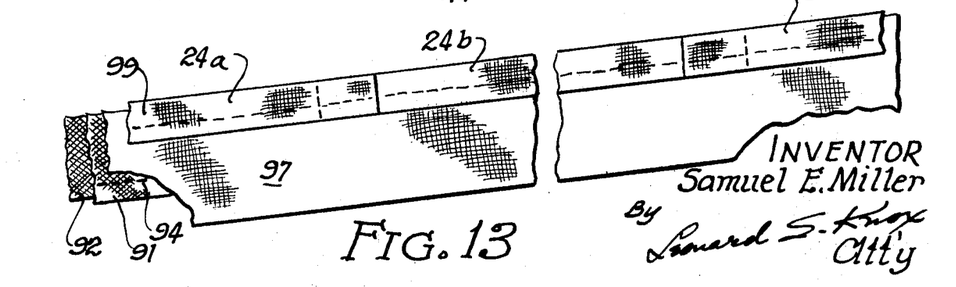
FIG. 13 is a perspective view of a typical waistband assembly after it leaves the sewing station.
Figure 18:
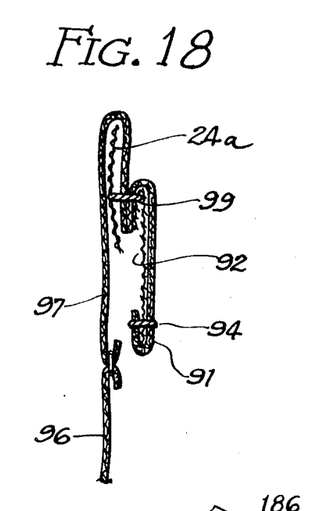
FIG. 18 is a cross section of waistbanding to indicate a typical construction and the description of the parts thereof.

Thus, referring to FIGS. 13 and 18, the waistband and curtain assembly may comprise a curtain 91 and a strip of scrim or canvas 92 forming part of the same, which are sewn together at 94 before being fed to the sewing machine herein described. The curtain comprising the parts 91 and 92 fed to the sewing station, together with the shell cloth waistband 97 as indicated at 96 (FIG. 3), along with the selected strip 24a or 24b the line of stitches being indicated at 99.

At a subsequent stage, not forming a part of the instant invention, the garment manufacturer will fold the shell fabric over the strips 24a and 24b to form the top edge 101 of the garment. FIG. 14 shows the completed product ready to be incorporated into the garment. FIG. 18 is the same except that the shell 96 of the garment has been added. Since the upper edge of the strips 24a and 24b define the fold line, i.e. the top edge of the finished garment, it will now be seen why, during passage to the needle, exact positioning of the left hand edge of the moving strip is of paramount importance.

The period of time during which the lever 65 is held in retracted position is adjustable either by lengthening the stroke of the piston 79 or by controlling admission of air thereto. It will be understood that advance of the strip 24a or 24b by activation of a cylinder 42a or 42b requires that the lever 65 be retracted either simultaneously or in advance thereof. The first result is easily obtained by admission of air to the then-selected cylinder 42a or 42b and the cylinder 75 simultaneously, and the second by utilizing the associated one of the time delay flow valves 55a or 55b.

Figure 19:
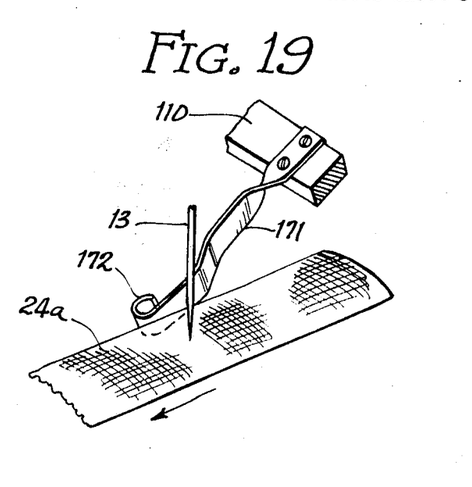
FIG. 19 is a perspective view of a spring located in advance of the guide throat, and beyond the needle.

In a modified form of guide (FIG. 15) the guide 121 comprises bottom, top and side walls, and is mounted on a bracket 122 arranged for lateral adjustment by screws 123 through an oversized slot 124. By suitable canting of the guide the advancing strip is caused to ride against the left-hand edge 120 of the exit end 128 whereby the strips is shown in FIG. 19. It has been found that, plained in connection with FIGS. 4 and 12. However, the arrangement described in connection with those figures is preferred since a definite lateral force is continuously applied notwithstanding variation in the width of a strip or between strips of different kinds.

An additional feature for maintaining alignment of the stripe is shown in FIG. 19. It has been found that, after the strip has been severed and before it has been sewn, the trailing end may have a tendency to whip since, at this time, the finger 65a is retracted to clear the succeeding strip. The net result is misalignment along the left edge. To avoid such misbehavior a cantilever spring 171 having an arcuate end 172 is secured to the member 110 or other convenient fixed part, as shown. The end 172 is arranged to bear on the right hand edge of the strip, e.g. the strip 24a with such force as to neutralize the tendency to whip. It will be observed that the point of contact is as close as practicable in advance of the needle in order that the function of the spring is effective for as long as possible Reference will now be made to FIGS. 4, 8, 9, 10 and 16 illustrating the means for severing, to some predetermined length, the strip then being fed. Located just in advance of the guide 61 is the block 110 having a pair of apertures 131, 132 each receiving an individual one of the strips 24a, 24b. FIG. 8 shows the cut-off mechanism as viewed from the front, and FIG. 9 as viewed from the rear. A base 135 (FIG. 10) is secured to any convenient part of the bed plate 11 of the sewing machine, and has a bracket 138 secured by screws 139. A pair of brackets 141, 141 are, in turn, adjustably mounted on the bracket 138 by bolts 142, 142 admitted in oversized slotted holes 143, 143 in order to permit adjustment. The member 110 is secured to the brackets 141, 141.

A pneumatic cylinder 151 is mounted on the member 110 and has a piston (not shown) and a piston rod 153. Air is supplied to each side of the piston alternatively, through ports 150, 152, to swing the knife 154 between its upper and lower positions as depicted in full and broken lines respectively (FIG. 9). The air supply to the ports 150, 152 is shown at 155, 156. Although the mechanism for translating reciprocation of the piston into movement of the knife may take many forms, there is shown, by way of example, a head 157, attached to the outboard end of the piston rod 153, to one side of which a rod 158 is pivotally connected. This rod 158 is pivotally connected at its opposite end to a pair of arms 162, 162 pivoted to an extension of the bracket 141.

An ear 166 is secured to one of the arms 162 as by rivets and the knife 154 is attached to the free end of the ear by screws 167.

From the foregoing it will have become apparent that reciprocation of the piston rod 153 results in swinging movement of the knife between its two positions. It is to be noted from FIG. 16 that the knife 154 has two sharp edges for shearing relation with the member 110, this latter being formed at its active surface to present a pair of back-off faces 110a, 110a defining sharp shearing edges. For clarity, the strips are omitted from FIG. 16. Thus movement of the knife toward one limit of its stroke will sever one of the strips and movement toward the other limit will sever the other. In order to urge the knife 154 against the fixed shearing faces 110a, 110a, a compression spring 181 is interposed between the upper one of the arms 162 (FIG. 10) and the fixed extension bracket in which the shaft 164 pivots.

Figure 20:
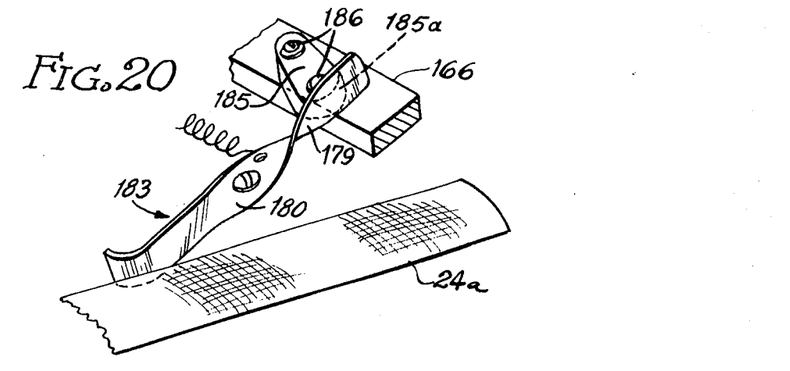
FIG. 20 illustrates an arrangement for operating the cut-off blade and strip guide concurrently.

For the reason that the steps of cut-off and retraction of the lever 65 occur substantially simultaneously, it is possible to eliminate the cylinder 75 and to provide that movement of the arm 166 also operate this lever. One way in which such joint operation may be carried out is to provide a cam surface on the arm 166 adapted to engage the end of a lever 183, for example, as shown in FIG. 20. It will be seen that the leg 180 of the lever 183, which performs the same function as the finger 65a, is arranged to be actuated by the cam 185 which is adjustably secured to the arm 166, by screws 186 passing through oversized holes therein. The end 179 of the lever 183 is shaped, as shown, for engagement by the cam. By suitable formation of the active face 185a of the cam 185, the dwell time, i.e., the time during which the lever 183 is held retracted, may be suitably determined. By adjusting the position of the cam 185, the phase relationship between cut-off and retraction of the lever 183 may be established as desired.

Air is a preferred medium for operating the apparatus. However, a hydraulic or electro-mechanical arrangement or combination of any of the foregoing may be utilized. For example, where air-operated control valves are shown, these may be solenoid-operated.

Accordingly, and referring to FIG. 11, there is shown a source of compressed air represented as a line 201 in which may be interposed a filter, a pressure regulator and an oiler, none of which are shown since they are conventional in pneumatically-controlled systems. In connection with the description of FIG. 11 the symbols and terminology are essentially those recommended by The American Society of Mechanical Engineers, Bulletin USAS Y32.10–1967.

A 4-way spool valve 211 is interposed in the air line 201 and has its plunger 212 adapted to be operated by one arm 214a of a bell crank 214 pivoted at 215. The valve 211 is arranged to be controlled by the operator by means of a pedal 223 and a chain 224 connecting the same to the other arm 214b of the bell crank 214.

In the position shown, air flow may be traced from the supply at 201 through the valve 211 to the blocked port 211a, and the system is quiescent.

To begin a cycle the operator will depress the pedal 223 which will cause arm 214a of the bell crank to shift the spool of valve 211 to the right. Air may then flow through port 211b, line 231, port 235a of a 4-way spool valve 235, line 237 to actuate pilot valve 238. It is to be noted that this pilot valve and others to be referred to are piston and cylinder arrangements actuatable by air pressure in one direction and restorable by a compression spring. Upon actuation of valve 238 the spool of the 4-way spool valve 241 is shifted so that its port 241a conditions a path from line 245 to line 56a.

Simultaneously with the sequence of events just referred to, air is passed through line 246 to actuate pilot valve 247 which shifts the 4-way spool valve 249 to the right. Thus air in line 251 is transferred through port 249a to branch 252 and into line 245 for operation of the feed cylinder 42a. However, it will be recalled that the feed cylinders are each equipped with flow retarding valves 55a and 55b so that the feed cylinder 42a is not actuated immediately but directly after cut-off of the strip then being fed. Thus, air passing through branch 252 is admitted, via line 155 to the cut-off cylinder 151 to operate the knife 154 whereby the other strip 24b, which had been advancing past the sewing station, is severed.

Since the piston 44a is to be restored to idle position following initiation of feed of the strip 24a, there is provided air-operated means for so doing. It has been found that a spring-restored piston is not as reliable as one which is positively restored. Accordingly, a branch 257 from the main supply at 201 is connected, via a pressure-reducing valve 258, into the lines 58a, 58b entering the lower end of the respective cylinders 42a, 42b. The pressure at the outlet side 58a, 58b of the valve 258 is considerably less than the pressure applied at the inlet 55a, 55b but yet is sufficient to restore the piston and the parts driven thereby when air flow to the inlet is interrupted.

The finger 65a is to be withdrawn from the position of FIG. 12 concurrently with initiation of feed of the strip 24a. To this end, the line 81 is connected to the line 245. It will be seen that, in effect, air is admitted to the cylinders 75 and 151 concurrently in order that the strip then advanced toward the sewing station finds the space between the lip 63 and finger 65a opened.

As soon as the operator releases the pedal 223 the valve 211 is shifted to its other position, as seen in the drawing, by the pilot valve 261 which receives line pressure through the conduit 262. The following sequence of events then occurs: air flow through the valve 211 is blocked at the closed port 211a; air pressure in the line 231 and passages in communication therewith is exhausted at 211c; the spring 241c has shifted the valve 241 to the position shown since, at that time the pilot valve 238 has been deactivated; line 56a is connected to exhaust at 241d so that low pressure air at 58a may restore the piston 44a to its upper position, and pilot valve 264 is operated, via line 265 and port 241e to shift the valve 235 to the right. Thus, the system is changed over to prepare the same for feeding of the next strip.

After a predetermined length of the strip 24a has been advanced to the sewing station the operator will depress the pedal 223 again. Thus the valve 211 is moved to the right and flow of air from source 201 may be traced as follows: from source 201, through port 211b, line 231, port 235b, line 271 and pilot valve 273, to shift 4-way spool valve 275 downward from the position shown against the force of its restoring spring 276f. At the same time air from source 201 flows through line 251, port 249b, branch 278, line 279, port 275a, line 56b to operate the piston 44b to initiate feed of the alternate strip 24b. Concurrently the port 275b connects line 281 from pilot valve 282 to exhaust at 275c. The branch 278 feeds line 156 which actuates the piston 153 to the left whereby the knife 154 is swung in the opposite direction to sever the strip 24a then being fed.

Upon release of the pedal 223 the valve 211 is shifted back to the position shown, thus allowing the spring 275f to restore the valve 275 to the position shown. Air at reduced pressure restores the piston 44b to flush the cylinder 42b via line 56b, port 275d to exhaust at 275c. Air is applied from line 251, via port 249b, lines 278 and 279, via port 275a and line 281 to pilot valve 282 and the valve 235 is shifted to the position shown ready for the next cycle.

When the piston 153 is shifted to the left, exhaust of air behind the same occurs via lines 155 and 252, port 249c to exhaust at 249e.

From the foregoing it will have become apparent that the operator need only depress the pedal momentarily to initiate a cycle and that the several events of a cycle occur automatically but alternated as to feeding and cutting from one strip to the other, and so on sequentially.

The purpose of the two check valves 76 and 77 associated with the cylinder 75 is to prevent short circuiting between the lines 237 and 245.

The response time of the feed cylinders 42a, 42b may be adjusted through the respective flow control valves, 55a, 55b. By reducing the response time the leading end of the succeeding strip may be caused to overlap its predecessor and, by increasing the response time, such leading end may be caused to lag, thereby creating a gap of predetermined extent between the two strips. This adjustment may be co-ordinated with the rate at which the strip is advanced by the feed dog of the sewing machine.

Figures 15, 16, 17:
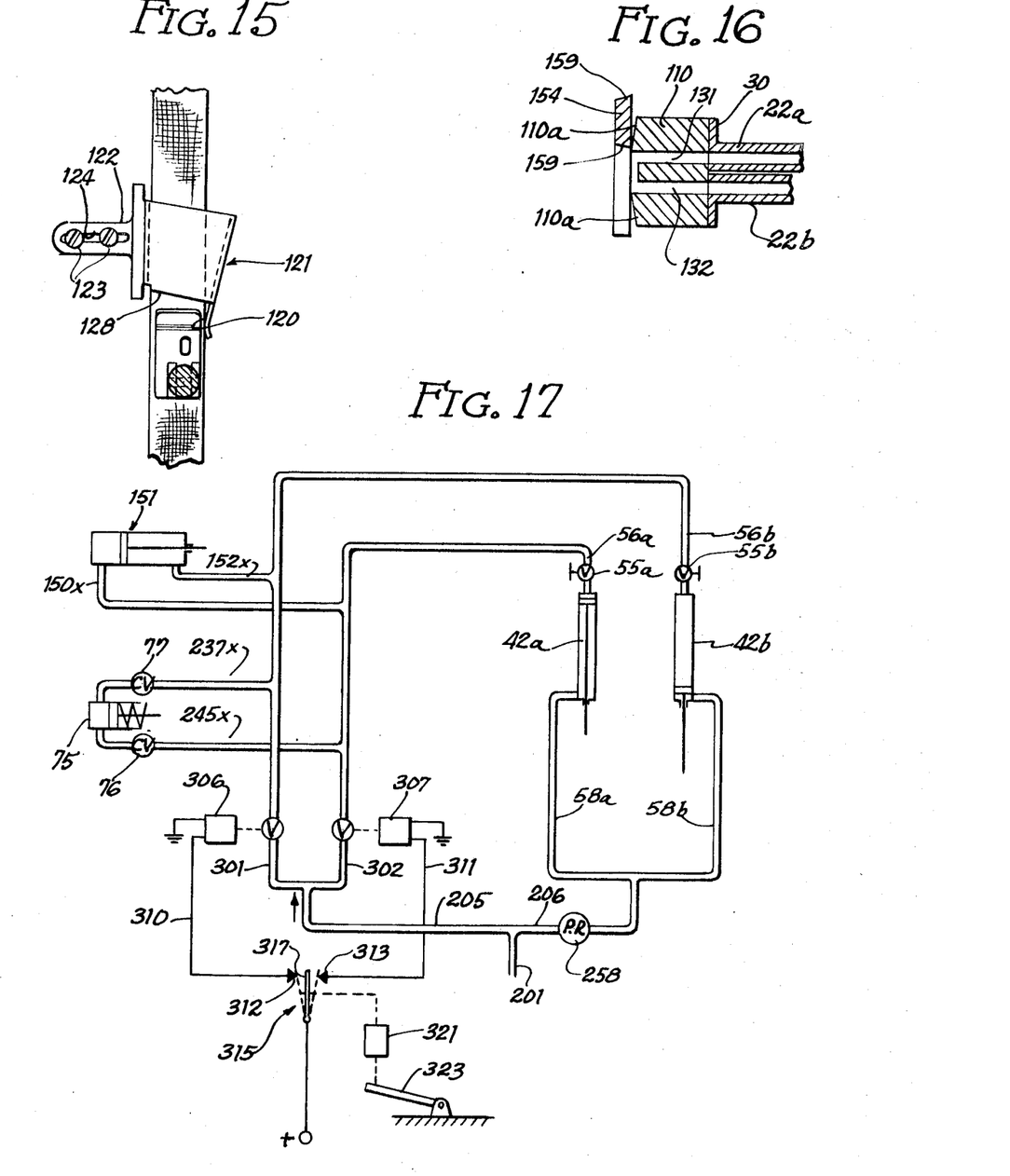
FIG. 15 is a detail, in plan, of an alternative form of guide throat.
FIG. 16 is a cross section on the line 16—16 of FIG. 9.
FIG. 17 is a schematic presentation of a modified arrangement for controlling the pneumatically-actuated components of the apparatus.

A modified embodiment is illustrated in FIG. 17. The lines 56a, 56b supplying air to the feed cylinders 42a and 42b and the cylinders 75 and 151 are connected in parallel. The air supply line 201 is branched into two lines 205, 206. Line 205, in turn, branches into lines 301, 302 each of which is arranged for selective flow through solenoid-operated valves 306, 307, corresponding to the feeding and cutting of a selected one of the strips 24a, 24b. The "hot" side of each of the solenoids is connected through leads 310, 311 to respective contacts 312, 313 of a switch 315.

The switch is of a type which, upon actuation, will throw its armature 317 to close on one or the other of the contacts 312 or 313 for momentary activation of the respective loads (broken lines), and then return to a neutral or idle position (solid lines). The operation is sequential, i.e. if closure on contact 312 has occurred then, upon the next actuation, the armature will close on contact 313 and vice versa. The armature is arranged to be moved from neutral to one or the other of its two positions by a suitable mechanism 321 which receives impulses from a pedal 323. Stated otherwise, successive operations of the pedal will close either of the circuits including the contacts 312, 313, in sequence. A typical mechanism together with the armature 317 and contacts 312 and 313 is available commercially from Square-D Company, Asheville, N.C., as its Mechanical Alternator, Class 9038, Type AG-1.

Thus, it will have become apparent that, upon succeeding depressions of the pedal 323 one or the other of the solenoid valves 306 or 307 will open to admit air to one or the other of the respective feed cylinders 42a or 42b for cutting the strip then being fed to the sewing machine and initiating feed of the other strip, and so on, cyclically. The cylinder 75, forming part of the guide assembly (FIG. 12) is connected in parallel with the lines 301 and 302 through branches 237x and 245x. The cylinder 151 associated with the cut-off mechanism is also connected in parallel with the lines 301 and 302 by means of branches 150x and 152x. Although this schematic representation may indicate that the several cylinders will be activated concurrently, it will be understood that suitable flow retarding devices and/or sequence devices may be introduced to provide a timed relation between feeding and cutting in a manner similar to that described above.

Figure 21:
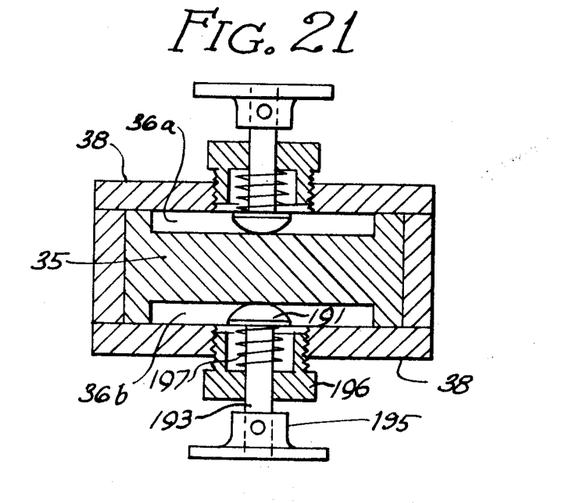
FIG. 21 shows, in plan, a modified form of friction device to apply braking force to the moving strip.

As an alternative to the hairpin springs 37, 37 (FIG. 5) the arrangement of FIG. 21 may be employed. Each of the chutes 22a, 22b, at their entrance end, is provided with a retractible button 191, e.g. of dome shape, fixed to the inner end of a pin 193 having a knob 195 at its outer end. The pin is supported for sliding movement in any convenient fixed part of the chute assembly, e.g. a bushing 196. A compression spring 197 normally urges the button inwardly to apply friction to the strip advancing through the chute 226 to apply a mild braking force thereto, as described in connection with the springs 37, 37. When the leading end of a fresh supply is to be fed into the chute, the button is momentarily retracted for freedom of access. Upon retraction of the button clearance is afforded by a hole 198 in the wall of the chute. It will be apparent that FIG. 21 shows only one of the arrangements just described, the other being a mirror image thereof.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. In apparatus for use with a sewing machine having stitch-forming means and means for feeding the material to be sewed past the stitch-forming means, said sewing machine being adapted to sew strips of different kinds selectively and sequentially at spaced intervals to and along a common strip, the selected strip and common strip being fed jointly past the stitch-forming means by the feeding means, the improvement which comprises: periodically-actuated means to sequentially select one of the first-mentioned strips and then substantially upon completion of attaching the first selected strip to select another of said strips, means individual to each of the first-mentioned strips to guide the same to sewing position, means individual to each of the first-mentioned strips to advance the leading end of the then-selected strips to the feeding means, means common to the several guiding means for severing the selected strip to a predetermined length prior to completion of the sewing thereof and means operatively inter-connecting the advancing means and severing means whereby the means advancing the newly selected one of the first-mentioned strips and the means for severing the first-mentioned strip then being sewn are actuated substantially concurrently upon each operation of the periodically-actuated means.

2. The combination in accordance with claim 1 wherein the periodically-actuated means includes a member under the control of the operator for initiating operation thereof.

3. The combination in accordance with claim 2 further characterized by automatic means for terminating operation of said periodically-actuated means.

4. In combination with a sewing machine having a sewing station including a needle and a presser foot and a feed dog for feeding the articles being sewn past the needle, apparatus for feeding a selected one of a plurality of different kinds of strips to the sewing station to be sewn to a common strip, cutting off the selected strip to some predetermined length prior to completion of sewing thereof and then feeding and cutting off another selected strip and so on sequentially, comprising: a source of supply of each of said plurality of first-mentioned strips, a chute individual to each strip thereof through which the strip is guided on its way to the sewing station, means individual to each chute operable to advance the strip therein a predetermined distance for engagement by the presser foot and feed dog, means located in the path of the strip then being sewn to cut the same, means under the control of the operator to actuate the cutting means at a predetermined time in the cycle and, substantially concurrently therewith, to actuate the advancing means individual to the succeeding one of the strips to advance said succeeding strip and means interconnecting said operator-controlled means with said advancing and cutting means, the next actuation of the operator-controlled means activating the advancement means individual to the next-succeeding strip and the cutting means, and so on sequentially.

5. The combination in accordance with claims 1, 2, 3 or 4 wherein the individual advancing means each comprises a reciprocating mechanism including a dog to engage the strip, said dog having a flexible connection with the said mechanism to cause engagement of the dog with the strip upon movement of the mechanism in the direction of advance of the strip and to cause disengagement thereof from the strip upon the return stroke of the mechanism.

6. The combination in accordance with claims 1, 2, 3 or 4 further characterized by means to delay the action of the advancing means pending actuation of the cutting means.

References Cited

UNITED STATES PATENTS

| | | | |
|---|---|---|---|
| 2,089,072 | 8/1937 | Roberts | 112—152 XR |
| 2,506,325 | 5/1950 | Ackerman | 112—152 XR |
| 2,862,467 | 12/1958 | Passaro et al. | 112—121.27 XR |
| 3,381,639 | 5/1968 | Miller | 112—130 |

H. HAMPTON HUNTER, Primary Examiner

U.S. Cl. X.R.

112—121.27, 152

UNITED STATES PATENT OFFICE
CERTIFICATE OF CORRECTION

Patent No. 3,515,081            Dated     June 2, 1970

Inventor(s)     Samuel E. Miller

It is certified that error appears in the above-identified patent and that said Letters Patent are hereby corrected as shown below:

Column 6, line 64, cancel "the strips is shown in FIG. 19. It has been found that," and insert -- the strip is constrained in definite alignment, all as ex- --; line 71, "stripe" should read -- strips --. Column 10, line 62, "strips" should read -- strip --. Column 11, line 27, "advancement" should read -- advancing --.

Signed and sealed this 7th day of December 1971.

(SEAL)
Attest:

EDWARD M. FLETCHER, JR.          ROBERT GOTTSCHALK
Attesting Officer               Acting Commissioner of Patents